(12) United States Patent
Kondo et al.

(10) Patent No.: US 6,539,130 B2
(45) Date of Patent: Mar. 25, 2003

(54) TRAVELING WAVE OPTICAL MODULATORS

(75) Inventors: Atsuo Kondo, Okazaki (JP); Jungo Kondo, Nishikamo-Gun (JP); Kenji Aoki, Ogaki (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/738,174

(22) Filed: Dec. 15, 2000

(65) Prior Publication Data

US 2001/0007601 A1 Jul. 12, 2001

(30) Foreign Application Priority Data

Dec. 15, 1999 (JP) .......................................... 11-355335

(51) Int. Cl.$^7$ ............................................. G02F 1/035
(52) U.S. Cl. ...................... 385/2; 385/3; 385/4; 385/5; 385/8; 385/9; 385/14; 385/15
(58) Field of Search .................................. 385/1–5, 9, 8, 385/40, 14, 15; 359/237, 245; 356/345; 430/321

(56) References Cited

U.S. PATENT DOCUMENTS

| | | | | |
|---|---|---|---|---|
| 6,069,729 A | * | 5/2000 | Gill et al. ..................... | 359/245 |
| 6,167,169 A | * | 12/2000 | Brinkman et al. ............. | 385/4 |
| 6,198,855 B1 | * | 3/2001 | Hallemeier et al. ............. | 385/2 |
| 6,219,469 B1 | * | 4/2001 | Minakata et al. ............. | 385/2 |
| 6,226,423 B1 | * | 5/2001 | Minakata et al. ............. | 385/2 |
| 6,341,031 B1 | * | 1/2002 | McBrien et al. ............. | 359/237 |

FOREIGN PATENT DOCUMENTS

| | | |
|---|---|---|
| EP | 0 485 993 A1 | 5/1992 |
| EP | 0 828 175 A2 | 3/1998 |
| JP | 10-133159 | 5/1998 |

OTHER PUBLICATIONS

U. S. Patent application Ser. No. 09/636,568, Kondo et al., filed Aug. 27, 2000.
U.S. Patent application Ser. No. 09/738,176, Kondo et al., filed Dec. 15, 2000.
Patent Abstracts of Japan, vol. 11, No. 026 (P–539), Jan. 24, 1987 & JP 61 198133 A (Fujitsu Ltd), Sep. 2, 1986 *abstract*.
Patent Abstracts of Japan, vol. 016, No. 540 (P–1450), Nov. 10, 1992 & JP 04 204815 A (Matsushita Electric Ind. Co. Ltd.), Jul. 27, 1992 *abstract*.
Bulmer, C.H. et al.; "*Phase Tuning of LiNbO$_3$ Interferometric Modulators by Laser Ablation*," Integrated Photonics Research, Technical Digest Series, U.S. Washington, DC, vol. 8, p. 63.

* cited by examiner

Primary Examiner—Frank G. Font
Assistant Examiner—Michael P. Mooney
(74) Attorney, Agent, or Firm—Burr & Brown (57) ABSTRACT

A traveling wave optical modulator includes an optical waveguide substrate made of an electro-optic and ferrodielectric single crystal in the form of an X- or Y-orientation plate and comprising a thicker portion having a larger thickness and a thinner portion having a smaller thickness; first and second branched optical waveguide portions formed at least on the thinner portion of the optical waveguide substrate; a set of electrodes provided on at least the thinner portion of the substrate and adapted for applying voltage to the first and second optical waveguide portions to modulate a light propagating the optical waveguide portions; and a buffer layer provided to cover a part of the optical waveguide portions at the thinner portion of the substrate, the electrodes crossing on the buffer layer.

10 Claims, 4 Drawing Sheets

TRAVELING WAVE OPTICAL MODULATORS

BACKGROUND OF THE INVENTION

1 Field of the Invention

The present invention relates to traveling wave optical modulators.

2 Related Art Statement

NGK Insulators, Ltd. reported in JP-A 10-133,159 that a traveling wave optical modulator was successfully operated at not less than 10 GHz by providing a thinner portion in a substrate of the modulator under an optical waveguide and setting the thickness of this thinner portion to not more than 10 μm, while providing no buffer layer made of silicon oxide or the like. In this manner, the optical waveguide substrate advantageously comprises such thick and thinner portions, because optical modulation is possible at high speeds without the formation of the buffer layer, a DC drift originating from the buffer layer can be avoided, and a product (Vπ·L) between a driving voltage Vπ and the length L of an electrode can be reduced.

However, NGK more specifically examined traveling wave optical modulators of this type, and then found that light absorption loss sometimes occurred in the optical waveguide. Particularly when the optical waveguides of the Mach-Zehnder type is formed, it is necessary that the optical waveguide is branched into two lines, and that lights, which come out from the branched optical waveguides are coupled together again, so that the absorption loss in each of the branched optical waveguide needs to be the same. However, the absorbing loss of one branched optical waveguide actually differed from that of the other, which might result in reduction in the extinction ratio.

SUMMARY OF THE INVENTION

It is an object of the present invention to suppress the absorption loss of the light in the optical waveguide in the traveling wave optical modulator, which can effect optical modulation at a high speed, and reduce a DC drift and a product (Vπ·L) between a driving voltage Vπ and the length L of an electrode.

The present inventors succeeded in suppressing the absorption loss in a traveling wave optical modulator, by constructing the modulator from (a) an optical waveguide substrate made of an electro-optic and ferrodielectric single crystal in the form of an X- or Y-orientation plate and comprising a thicker portion having a larger thickness and a thinner portion having a smaller thickness; (b) first and second branched optical waveguide portions formed at least on the thinner portion of the optical waveguide substrate; (c) a set of electrodes provided on at least the thinner portion of the substrate and adapted for applying voltage to the first and second optical waveguide portions to modulate a light propagating the optical waveguide portions; and (d) a buffer layer provided to cover a part of the optical waveguide portions at the thinner portion of the substrate, the electrodes crossing on the buffer layer.

These and other objects, features and advantages of the invention will be well appreciated upon reading the following description of the invention when taken in conjunction with the attached drawings, with the understanding that some modifications, variations and changes of the invention could be easily made by the skilled person in the art to which the invention pertains.

BRIEF DESCRIPTION OF THE ATTACHED DRAWINGS

For a better understanding of the present invention, reference is made to the attached drawings, wherein.

DETAILED DESCRIPTION OF THE INVENTION

In the present invention, the substrate is made of an electro-optic and ferrodielectric single crystal having a given shape, e g., in the form of an X- or Y-orientation plate. So long as the crystal can be optically modulated, no limitation is posed. For example, lithium niobate, potassium lithium niobate, lithium tantalate, KTP, glass, silicon, GaAs and quartz may be recited. At least one single crystal selected from the group consisting of a single crystal of lithium niobate, a single crystal of lithium tantalate and a solid solution single crystal of lithium niobate-lithium tantalate is particularly preferred.

The substrate has opposed main planes, and an optical waveguide 3 of a Mach-Zehnder type is formed on one of the opposed main planes. A recess is formed in the other main plane having an almost rectangular parallelepiped shape, opening in the other main plane. Thus, a thinner portion is defined, corresponding to the recess, while a thicker portion is provided around the thinner portion, for example. A set of electrodes are provided on at least the thinner portion of said one main plane of the substrate for applying voltage to the first and second optical waveguide portions of the optical waveguide to modulate a light propagating the optical waveguide portions.

A buffer layer is provided to cover a part of the optical waveguide portions at the thinner portion of the substrate, the electrodes crossing on the buffer layer.

In the present invention, the following (1) to (4) are preferred. Any combination of (1) to (4) may be considered as preferable embodiments, so long as no contradiction occurs.

(1) Pural buffer layers are provided at respectively plural portions which the electrodes cross. By so doing, the optical absorption loss in one optical waveguide portion can be approached to that in the other. It is preferable that a deviation between a total length of said plural buffer layers in one optical waveguide portion as extending along the optical waveguide portion and that of said plural buffer layers in the optical waveguide portion as extending along the optical waveguide portion is reduced to a low level, preferably not more than 0.2 mm, and more preferably the former length is substantially equal to the latter.

(2) Each of said plural buffer layers has such a band-like shape as extending along the optical waveguide portion. By adopting the buffer layers having such a shape, the DC drift resulting from the buffer layers can be minimized.

(3) At least one end portion of the buffer layer or at least one buffer layer as viewed along the optical waveguide portions is provided with a taper portion of which thickness gradually changes as viewed along the optical waveguide. By so constructing, occurrence of a discontinuous point where a characteristic impedance sharply changes can be prevented. Further, since no rapid mode (opto-electro field) change does not occurs, reflection of light under the buffer layer can be prevented.

(4) The traveling wave optical modulator is adapted to pass a TE mode light through the optical waveguide portions.

The thickness of the thicker portion is preferably not less than 300 µm from the point of view of affording strength upon the optical waveguide substrate.

The thickness of the thinner portion is preferably not more than 20 µm, more preferably not more than 10 µm, from the standpoint of view of conspicuously reducing the effective refractive index of the microwaves. Further, this thickness is preferably not less than 5 µm from the standpoint of view of preventing cracking on working the thinner portion.

The thickness of the buffer layer is preferably not less than 0.3 µm from the standpoint of view of suppressing the absorption loss of the light propagating the optical waveguide. On the other hand, the thickness of the buffer layer is preferably not more than 1.5 µm from the standpoint of view of suppressing the DC drift.

The electrodes are not limited to any material, so long as it has a low resistance and an excellent characteristic impedance. The electrodes may be made of gold, silver or copper, etc.

As the buffer layer, a known material such as silicon oxide, magnesium fluoride, silicon nitride or alumina may be used. The buffer layer may be formed by a known method such as a lithography method.

Figure 1:
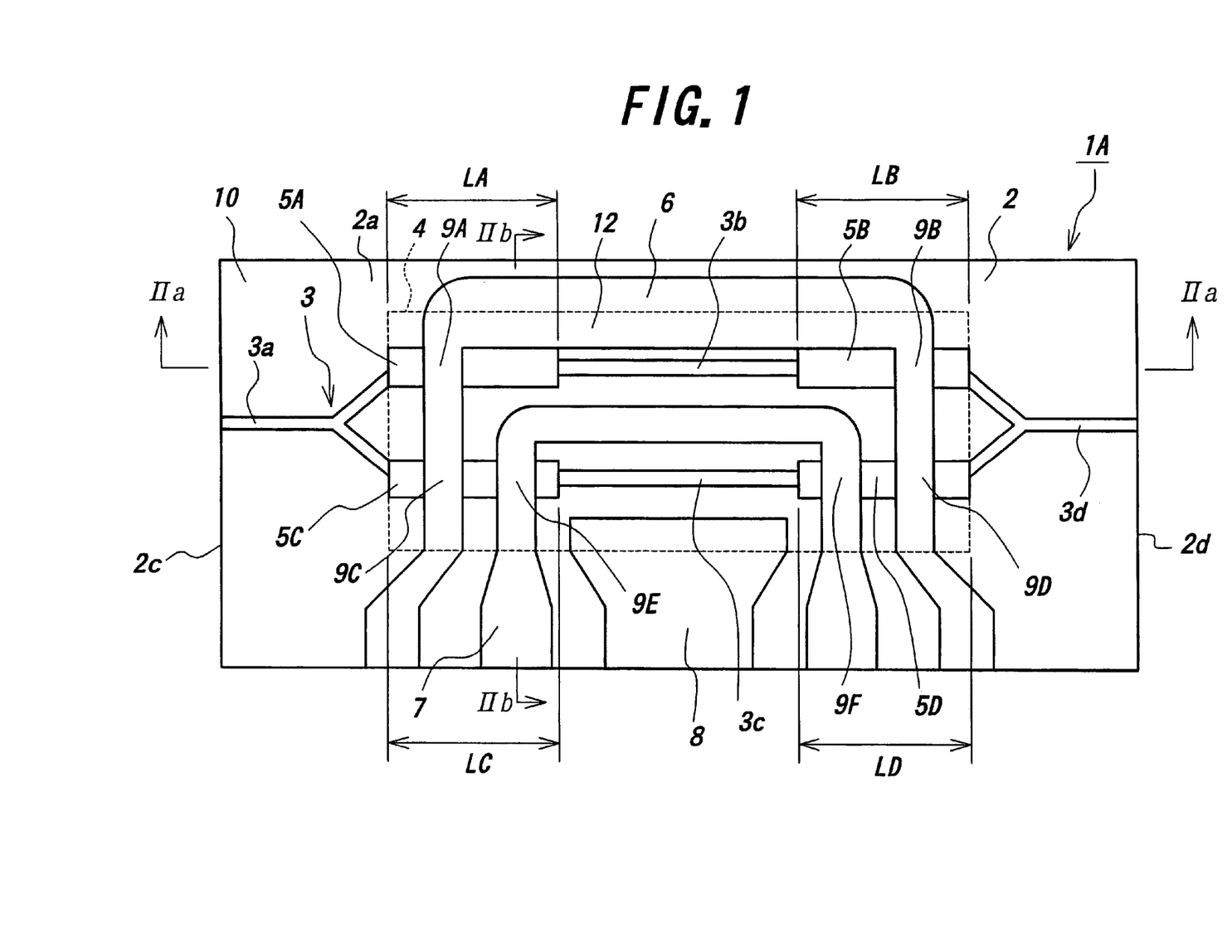
FIG. 1 is a plane view schematically showing one embodiment 1A of the traveling wave optical waveguide according to the present invention.
Figure 2A:
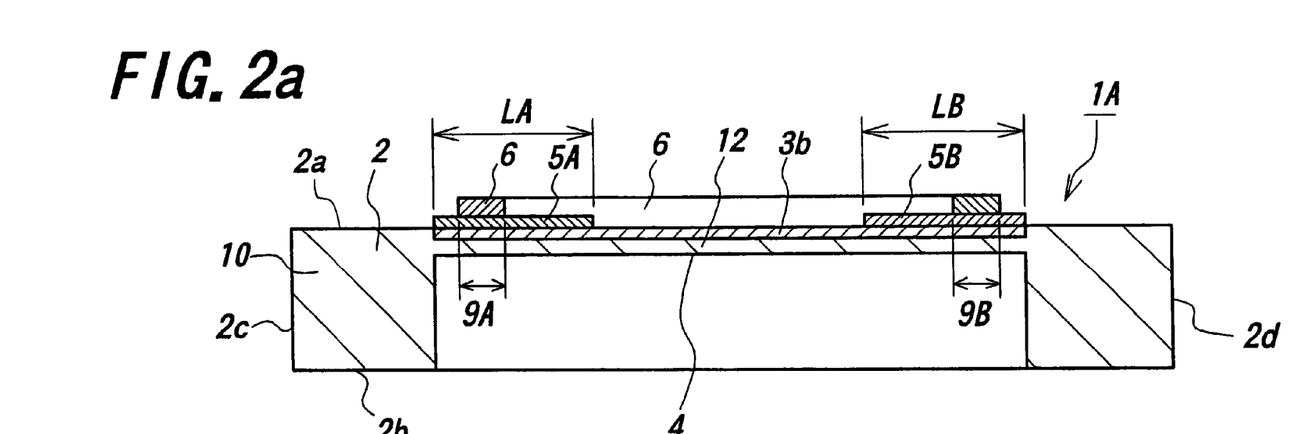
FIGS. 2(a) and 2(b) are sectional views of the embodiment in FIG. 1 taken along a IIa—IIa line and a IIb—IIb, respectively.
Figure 2B:
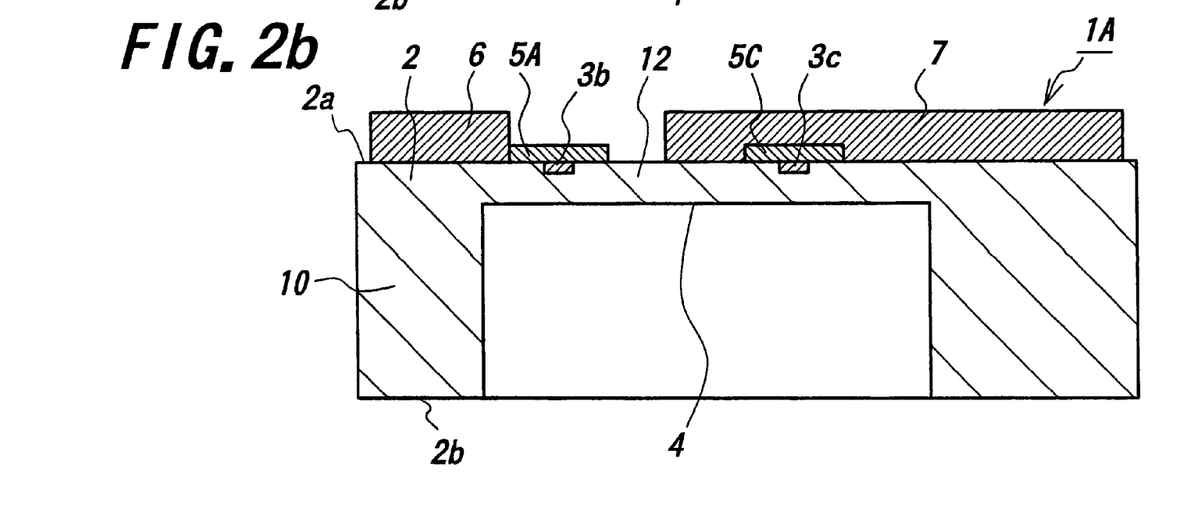

The present invention will be explained in more detail with reference to FIGS. 1, 2(a) and 2(b). FIG. 1 is a plan view schematically showing one embodiment 1A of the traveling wave optical waveguide modulator according to the present invention, and FIGS. 2(a) and 2(b) are sectional views of the embodiment in FIG. 1 taken along a IIa—IIa line and a IIb—IIb, respectively.

A substrate 2 is made of and a ferrodielectric and electro-optic single crystal as mentioned above, in the form of an X- or Y-orientation. The substrate has opposed main planes 2a and 2b. For example, an optical waveguide 3 of a Mach-Zehnder type having a given shape is formed on one main plane 2a. In the present embodiment, the optical waveguide 3 comprises an inlet portion 3a, branched portions 3b, 3c and a coupled portion 3d. Reference numerals 2c and 2d denote light inlet and outlet end faces of the substrate 2, respectively.

In a central portion of the substrate 2 is formed a recess 4 having an almost rectangular-parallelepiped shape and opened at the other main plane, which defines a thinner portion 12 above the recess 4. A thicker portion is provided such that it surrounds the recess and the thinner portion 12 from four sides. Electrodes 6, 7 and 8 are formed on the main plane 2a of the substrate 2. The electrodes 6 and 8 function as ground electrodes, and the electrode 9 functions as a signal electrode. When discussed based on FIG. 1, the main portion of the electrode 6 is provided above and substantially in parallel to the upper branched optical waveguide portion 3b, and opposite end portions of the electrode 6 extend down to a lower side of the substrate so that they may be electrically connected to a high frequency signal circuit (not shown). The main portion of the electrode 7 is provided between and substantially in parallel with the upper and lower branched optical waveguide portions 3b and 3c, and opposite end portions of the electrode 7 extend down to the lower side of the substrate within the opposite end portions of the electrode 6, so that they may be electrically connected to the high frequency signal circuit. The electrode 8 extend downwardly from beneath the branched optical waveguide 3c to the lower side of the substrate within the opposite end portions of the electrode 8, so that it may be electrically connected to the high frequency signal circuit. The electrode 8 has almost inverted trapezoidal shape having an upper side substantially in parallel with the branched optical waveguide 3c.

In the present embodiment, an X plate or a Y plate made of lithium niobate is used as a substrate 2, for example. Therefore, a TE-mode light is transmitted in the optical waveguide. The branched portions 3b, 3c are provided in gap regions between the electrodes 6, 7 and 8, respectively.

In this embodiment, the optical waveguide 3 intersects with the electrodes 6 and 7 at six crossing portions 9A, 9B, 9C, 9D, 9E and 9F as viewed in plane. Each crossing portion exists on the thinner portion 12.

Slender or band-shaped buffer layers 5A and 5B are formed on the branched optical waveguide 3b such that each of the buffer layers covers a part of the branched optical waveguide 3b. The buffer layers 5A and 5B are spaced from each other. The buffer layer 5A is interposed between the electrode 6 and the branched optical waveguide 3b at the crossing portion 9A. The buffer layer 5B is interposed between the electrode 6 and the branched optical waveguide 3b at the crossing portion 9B.

Band-shaped buffer layers 5C and 5D are formed on the branched optical waveguide 3c such that each of the buffer layers covers a part of the branched optical waveguide 3c. The buffer layers 5C and 5D are spaced from each other. The buffer layer 5C is interposed between the electrode 6 and the branched optical waveguide 3c at the crossing portions 9C and between the electrode 7 and the branched optical waveguide 3c at the crossing portion 9E.

The buffer layer 5D is interposed between the electrode 6 and the branched optical waveguide 3c at the crossing portions 9D and between the electrode 7 and the branched optical waveguide 3c at the crossing portion 9F.

In this way, only a part of the optical waveguide is covered with the buffer layers, and the electrodes are passed on the buffer layers. Consequently, the absorption loss of the light propagating through the optical waveguide is successfully suppressed. In addition, it is confirmed that this does not adversely affect the high-speed modulating characteristic, or cause the DC drift resulting from the buffer layers.

In a preferred embodiment, a plurality of the buffer layers are provided at the thinner portion, and each electrode passes on each of the buffer layers as shown in FIG. 1.

Further, plural rows of the optical waveguides are formed on the thinner portion, and each optical waveguide is partially covered with the buffer layer. By this construction, the amount of the light absorption loss can be approached among the optical waveguides.

In this case, it is particularly preferable that differences among the covering lengths over which the buffer layers cover each of the optical waveguides are not more than 0.2 mm, more preferably almost equal to one another. For example, in the embodiment of FIG. 1, the covering length (LA+LB) over which the branched optical waveguide 3b is covered with the buffer layers 5A and 5B is set equal to that (LC+LD) over which the branched optical waveguide 3c is covered with the buffer layers 5C and 5D. By this construction, the light absorption losses in the optical waveguides can be made equal to each other or one another, thereby improving the extinction ratio.

Preferably, the buffer layer has a band shape, and the electrode extends crossing the band-shaped buffer layer. By adopting the thus configured buffer layer, the DC drift resulting from the buffer layer can be minimized.

In a particularly preferred embodiment of the present invention, the buffer layer is provided with a tapered zone at one end or both ends thereof, which gradually reduces its thickness when viewed in a longitudinal direction of the optical waveguide. By this construction, occurrence of a discontinuous point where the characteristic impedance rapidly changes can be prevented. Further, since the light does not undergo rapid mode change (optoelectric field 光電界) during passage immediately under the buffer layer, the reflection of the light under the buffer layer can be prevented.

Figure 3:
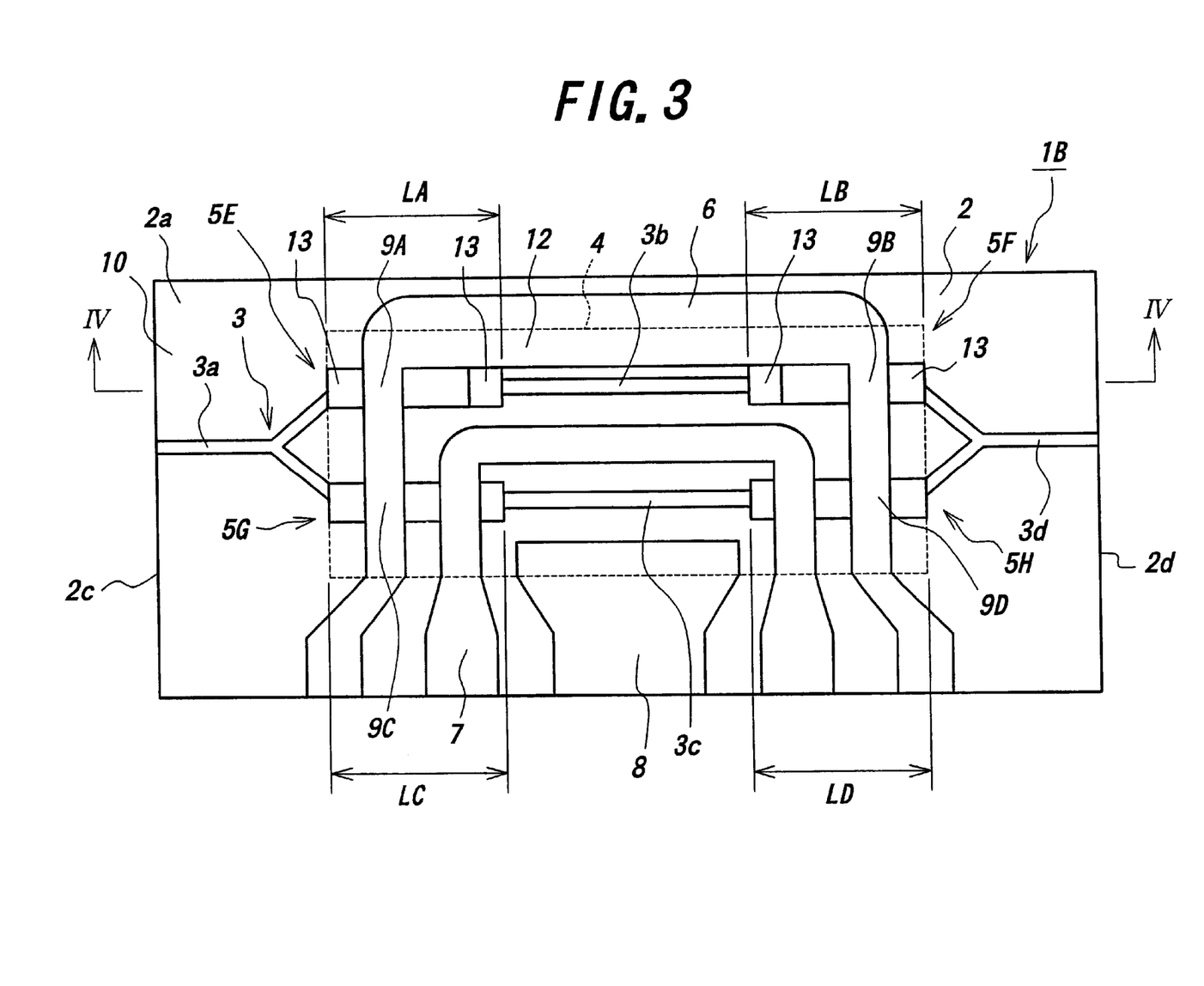
FIG. 3 is a plane view schematically showing another embodiment 1B of the traveling wave optical waveguide according to the present invention.
Figure 4:
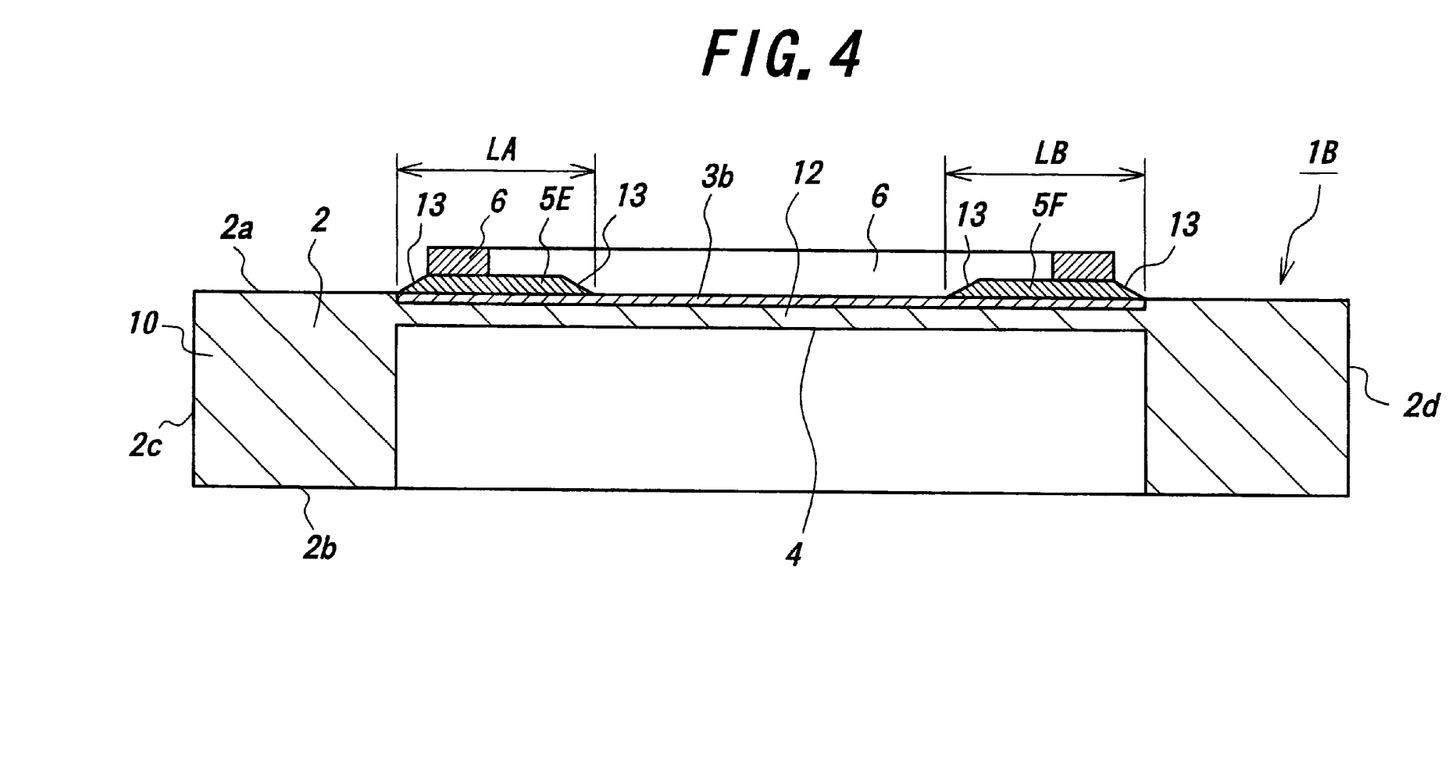
FIG. 4 is a sectional view of the embodiment in FIG. 4 along with a IV—IV line.

FIG. 3 is a plane view showing a traveling wave optical modulator 1B having the above configuration, and FIG. 4 is a sectional view of the embodiment of FIG. 3 along a IV—IV line. In FIGS. 3 and 4, the same or similar constituent parts are denoted by the same reference numerals in FIGS. 1 and 2, and explanation on them will be omitted.

In the traveling wave optical modulator 1B according to this embodiment, a taper portion 13 is provided at each of both ends of each of the buffer layers 5E, 5F, 5G, 5H. The thickness of each buffer layer in the tapered portion gradually changes, i.e., decreases toward the end.

In the following, the present invention will be explained in more detail with reference to specific examples.

EXAMPLES (Experiment A)
Production of a traveling wave optical modulator in Invention

Example 1

A traveling wave optical modulator 1A as shown in FIGS. 1, 2(a) and 2(b) was produced. More specifically, a wafer was prepared from a X-cut single crystal of $LiNbO_3$, and its main planes were ground to a wafer thickness of 300 μm. A Mach-Zehnder type optical waveguide 3 was formed on one of the main planes, 2A, according to a titanium diffusion process and a photolithography. Next, buffer layers 5A to 5D were formed of silicon oxide as shown by using the photolithography method. Then, electrodes 6, 7 and 8 were formed of gold on the wafers, crossing the buffer layers as shown, respectively. The thus produced wafer was cut into traveling wave optical modulators with a dicing saw machine, and end faces of each optical waveguide 3 were optically polished.

Next, each of the main planes were coated with a photoresist film, and the optical modulator was set at an excimer laser machine in which a location of the optical modulator to be worked was aligned with reference to an orientation flat plane of the substrate. The other main plane 2b was worked through exposure to a light from a KrF excimer laser according to a spot scanning method. The optical system was adjusted so that the size of the irradiated spot was 1.0 mm in a scanning direction and 0.2 mm in width and an irradiating energy density of 6.0 $J/cm^2$. A recess 4 was formed by working the substrate at a back side of the electrode with a laser at a pulse width of 15 nsec, a pulse frequency of 600 Hz and a scanning speed of 0.1 mm/sec.

The thickness of the thicker portion of the optical waveguide substrate 2 was 300 μm, and that of the thinner portion 10 μm. The gap between the adjacent electrodes 6, 7 and 8 was 26μ. The width of the titanium pattern was 6 μm in forming the optical waveguide 3. Each buffer layer had the thickness of 0.4 μm, a width of 100 μm and a length of 0.2 mm. Those portions 9A to 9D of the electrode 6 crossing the buffer layers were each 50 μm, and those portions 9E and 9F of the electrode 7 crossing the buffer layers were each 50 μm. The thickness of each of the electrodes was 30 μm. Lengths LA, LB, LC and LD as shown were all 0.2 mm. Therefore, (LA+LB) was equal to (LC+LD).

(Production of a traveling optical waveguide modulator as a comparative example)

A traveling optical waveguide modulator was produced in the same manner as in Invention Example 1, provided that no buffer layers 5A to 5D were provided.

(Measurement of the optical insertion loss)

Twenty eight traveling wave optical modulators were prepared in each of Invention Example 1 and Comparative Example. Single core fiber arrays each having a single mode optical fiber for 1.5 μm wavelength use were prepared, and coupled with respective modulators, and bonded thereto with an ultraviolet light-curable resin in the state that the optical fiber was aligned with the optical waveguide. With respect to the modulators in Invention Example and Comparative Example, the insertion loss was measured, and results are shown in Table 1.

TABLE 1

| | Optical insertion loss (n = 28) | |
| --- | --- | --- |
| | Average value | Difference between upper and lower values |
| Invention Example 1 | 3.9 dB | 0.4 dB |
| Comparative Example | 9.7 dB | 0.8 dB |

(Experiment B)

Experiment B was conducted as in Invention Example 1, provided that LA and LB were 0.15 mm and 0.25 mm, respectively, while LC and LD were both 0.25 mm. Therefore, (LA+LB)=0.4 mm, and (LC+LD)=0.5 mm. This was taken as Invention Example 2.

With respect to each of Comparative Example and Invention Example 1 in Experiment B and the above Invention Example 2, sixteen traveling optical waveguide modulators were produced. Then, as in Experiment A, optical fibers were coupled with the respective modulators, and then an on-off extinction ratio was measured. Results are shown in Table 2.

TABLE 2

| | On-off extinction ratio (n = 16) | |
| --- | --- | --- |
| | Average value | Difference between upper and lower values |
| Invention Example 1 | 24.6 dB | 3.2 dB |
| Invention Example 2 | 23.4 dB | 2.8 dB |
| Comparative Example | 12.3 dB | 2.8 dB |

As mentioned above according to the present invention, the light absorption loss can be suppressed in the traveling wave optical modulator having the thinner portion and the thicker portion, which modulator can perform optical modulator at a high speed.

What is claimed is:

1. A traveling wave optical modulator comprising:

an optical waveguide substrate made of an electro-optic and ferrodielectric single crystal in the form of an X- or Y-orientation plate and comprising a thicker portion having a larger thickness and a thinner portion having a smaller thickness;

at least first and second branched optical waveguide portions formed at least on the thinner portion of the optical waveguide substrate;

a set of electrodes provided on at least the thinner portion of the substrate and adapted for applying voltage to at least said first and second optical waveguide portions to modulate a light propagating the optical waveguide portions; and a buffer layer provided to cover a part of the optical waveguide portions at the thinner portion of the substrate, the electrodes crossing on the buffer layer.

2. The traveling wave optical modulator set forth in claim 1, wherein plural buffer layers are provided at respectively plural portions which the electrodes cross, and a deviation between a total length of said plural buffer layers in one optical waveguide portion as extending along the optical waveguide portion and that of said plural buffer layers in the optical waveguide portion as extending along the optical waveguide portion is not more than 0.2 mm.

3. The traveling wave optical modulator set forth in claim 2, wherein each of said plural buffer layers has a band-like shape extending along the optical waveguide portion.

4. The traveling wave optical modulator set forth in claim 1, wherein at least one end portion of the buffer layer or at least one buffer layer as viewed along the optical waveguide portions is provided with a taper portion of which thickness gradually changes as viewed along the optical waveguide.

5. The traveling wave optical modulator set forth in claim 1, which is adapted to pass a TE mode light through the optical waveguide portions.

6. The traveling wave optical modulator set forth in claim 4, which is adapted to pass a TE mode light through the optical waveguide portions.

7. The traveling wave optical modulator set forth in claim 2, wherein at least one end portion of the buffer layer or at least one buffer layer as viewed along the optical waveguide portions is provided with a taper portion of which thickness gradually changes as viewed along the optical waveguide.

8. The traveling wave optical modulator set forth in claim 3, wherein at least one end portion of the buffer layer or at least one buffer layer as viewed along the optical waveguide portions is provided with a taper portion of which thickness gradually changes as viewed along the optical waveguide.

9. The traveling wave optical modulator set forth in claim 2, which is adapted to pass a TE mode light through the optical waveguide portions.

10. The traveling wave optical modulator set forth in claim 3, which is adapted to pass a TE mode light through the optical waveguide portions.

* * * * *

UNITED STATES PATENT AND TRADEMARK OFFICE
CERTIFICATE OF CORRECTION

PATENT NO. : 6,539,130 B2
DATED : March 25, 2003
INVENTOR(S) : Atsuo Kondo, Jungo Kondo and Kenji Aoki It is certified that error appears in the above-identified patent and that said Letters Patent is hereby corrected as shown below:

Column 1,
Line 34, please change "differed" to -- differs --
Line 34, please change "other, which might result in" to -- other waveguide portion, the result could be a --
Line 49, please delete "__"

Column 2,
Line 51, please change "pural" to -- plural --
Line 54, please change "approached" to -- similar --
Line 54, please add -- waveguide portion -- after "other"
Line 56, please change "said" to -- the --
Line 58, please change "said" to -- the --
Line 63, please change "said" to -- the --

Column 3,
Line 8, please delete "does not"
Line 22, please change "on working" to -- in --
Line 44, please delete "and" (first occurrence)
Line 57, please add -- 10 -- after "portion" (second occurrence)
Line 61, please change "9" to -- 7 --

Column 4,
Line 7, please change "extend" to -- extends --
Line 59, please change "approached" to -- substantially matched --

UNITED STATES PATENT AND TRADEMARK OFFICE
CERTIFICATE OF CORRECTION

PATENT NO.   : 6,539,130 B2
DATED        : March 25, 2003
INVENTOR(S)  : Atsuo Kondo, Jungo Kondo and Kenji Aoki It is certified that error appears in the above-identified patent and that said Letters Patent is hereby corrected as shown below:

Column 5,
Line 17, please delete Japanese characters after "(optoelectric field"

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,539,130 B2
DATED : March 25, 2003
INVENTOR(S) : Atsuo Kondo, Jungo Kondo and Kenji Aoki It is certified that error appears in the above-identified patent and that said Letters Patent is hereby corrected as shown below:

Title page,
Item [57], ABSTRACT,
Line 4, please change "plate_and comprising" to -- plate. The substrate includes --
Line 5, please change "thickness;" to -- thickness. --
Line 6, please change "first" to -- First --
Line 7, please add -- are -- before "formed"
Line 8, please change "substrate; a set of electrodes" to -- substrate. A set of electrodes are --
Line 9, please add -- are -- after "and"
Line 11, please change "portions;" to -- portions. --
Line 12, please change "and a buffer layer" to -- A buffer layer is --
Line 13, please add -- with -- after "substrate,"

Column 1,
Line 34, please change "differed" to -- differs --
Line 34, please change "other, which might result in" to -- other waveguide portion, the result could be a --
Line 49, please delete "__"

Column 2,
Line 51, please change "pural" to -- plural --
Line 54, please change "approached" to -- similar --
Line 54, please add -- waveguide portion -- after "other"
Line 56, please change "said" to -- the --
Line 58, please change "said" to -- the --
Line 63, please change "said" to -- the --

Column 3,
Line 8, please delete "does not"
Line 22, please change "on working" to -- in --
Line 44, please delete "and" (first occurrence)
Line 57, please add -- 10 -- after "portion" (second occurrence)
Line 61, please change "9" to -- 7 --

Column 4,
Line 7, please change "extend" to -- extends --
Line 59, please change "approached" to -- substantially matched --

UNITED STATES PATENT AND TRADEMARK OFFICE
CERTIFICATE OF CORRECTION

PATENT NO.    : 6,539,130 B2
DATED         : March 25, 2003
INVENTOR(S)   : Atsuo Kondo, Jungo Kondo and Kenji Aoki

It is certified that error appears in the above-identified patent and that said Letters Patent is hereby corrected as shown below:

Column 5,
Line 17, please delete Japanese characters after "(optoelectric field"

This certificate supersedes Certificate of Correction issued November 18, 2003.

Signed and Sealed this

Ninth Day of November, 2004

JON W. DUDAS
*Director of the United States Patent and Trademark Office*